United States Patent

Stewart

[15] 3,638,307

[45] Feb. 1, 1972

[54] CUTTING SHEARS

[72] Inventor: Charlie G. Stewart, P.O. Box 327, Fairfield, Ala. 35064

[22] Filed: Oct. 30, 1969

[21] Appl. No.: 872,615

[52] U.S. Cl. ............................................................30/193
[51] Int. Cl. ......................................................B26b 13/26
[58] Field of Search .........................30/190, 192, 193, 251

[56] References Cited

UNITED STATES PATENTS

| 677,419 | 7/1901 | Lott | 30/251 |
| 1,164,981 | 12/1915 | Bernard | 30/193 |

FOREIGN PATENTS OR APPLICATIONS

| 2,633 | 2/1892 | Great Britain | 30/190 |

*Primary Examiner*—Theron E. Condon
*Assistant Examiner*—J. C. Peters
*Attorney*—Clarence A. O'Brien and Harvey B. Jacobson

[57] ABSTRACT

A pair of shears including relatively swingable jaws and relatively swingable levers. The jaws are pivotally connected for relative swinging about a first axis stationarily positioned relative to both jaws and the levers are also connected for relative swinging movement. The levers are further operatively connected to the jaws for relative swinging of the latter in response to relative swinging of the levers with the axis of relative swinging of the jaws shifting relative to both levers during relative swinging of the jaws.

7 Claims, 8 Drawing Figures

Charlie G. Stewart
INVENTOR.

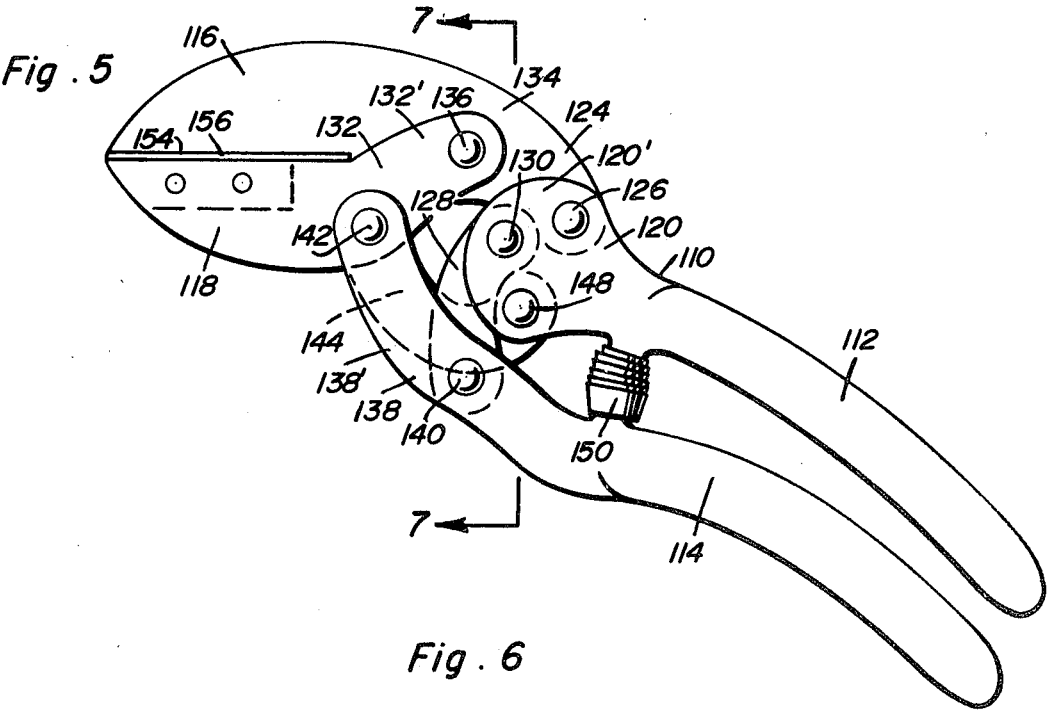
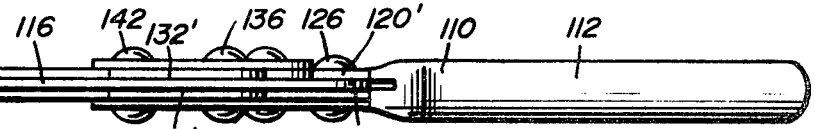
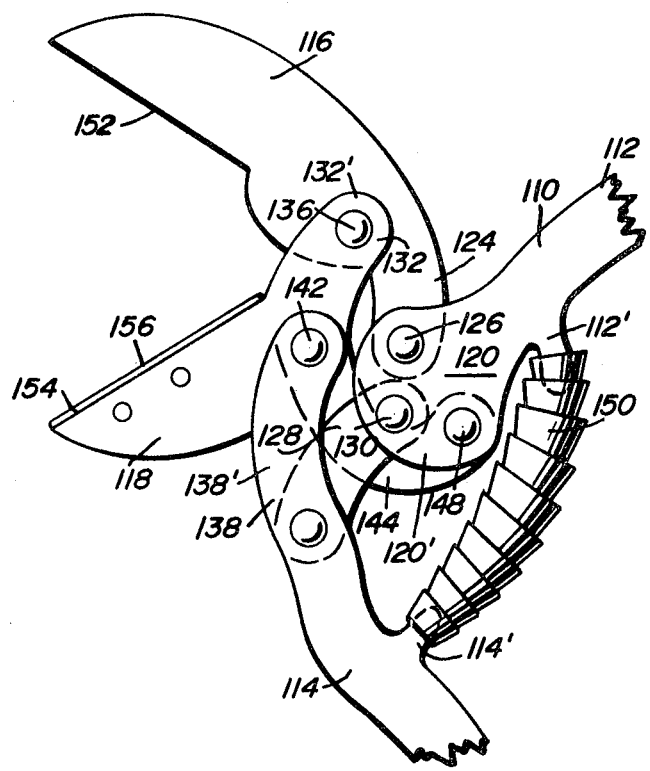
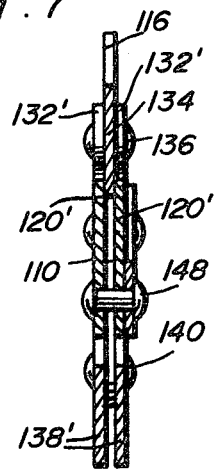
Charlie G. Stewart
INVENTOR.

CUTTING SHEARS

The shears of the instant invention includes a pair of relatively pivotable jaws and a pair of relatively swingable levers with the latter connected to the former in a manner such that a compound linkage is formed and final movement of the jaws of the shears toward their cutting position requires greater relative angular displacement of the levers of the shears than initial movement of the jaws to the closed cutting position. Thus, the shears have a built-in mechanical advantage which is brought into play as the cutting jaws approach their closed or cutting positions.

The shears are further constructed in a manner whereby they may be provided with relatively short pruning blades or relatively long blades such as those used in trimming hedges and the like.

The main object of the invention is to provide a pair of shears wherein a novel compound linkage is provided between the relatively pivotable jaws of the shears and the relatively swingable lever handles of the shears.

Still another object of this invention is to provide a pair of shears in accordance with the preceding object and including compound linkage between the handles and the shear jaws which will function in a manner to increase the mechanical advantage of the lever handles on the shear jaws as the shear jaws move toward their closed cutting positions.

A still further object of this invention is to provide a pair of shears constructed in a manner whereby normal tolerances between relatively movable parts thereof will particularly well adapt the shears, when equipped with short blades, to utilize a single cutting and an anvil blade.

Another important object of this invention, in accordance with the immediately preceding object, is to provide a pair of shears whose cutting blade will automatically be movable into planar relationship with the cooperating anvil surface of the anvil blade, even when wear has occurred between the relatively movable parts of the shears.

A final object of this invention to be specifically enumerated herein is to provide a pair of shears which will conform to conventional forms of manufacture, be of simple construction and easy to use as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 5 is a side elevational view of a second form of shear constructed in accordance with the present invention;

FIG. 6 is a top plan view of the assemblage illustrated in FIG. 5;

FIG. 7 is a vertical sectional view taken substantially upon the plane indicated by the section line 7—7 of FIG. 5; and FIG. 8 is a fragmentary side elevational view of the shears illustrated in FIG. 6 but with the blade jaws thereof in their open positions.

Figure 1:
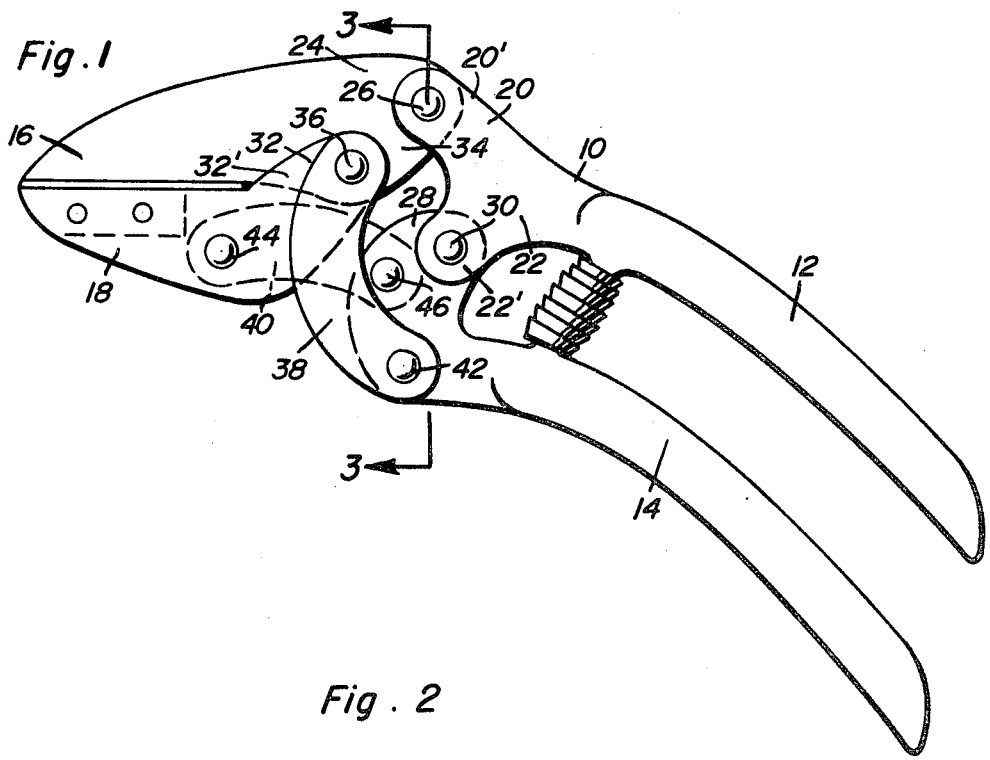
FIG. 1 is a side elevational view of a first form of shears constructed in accordance with the present invention.
Figure 2:
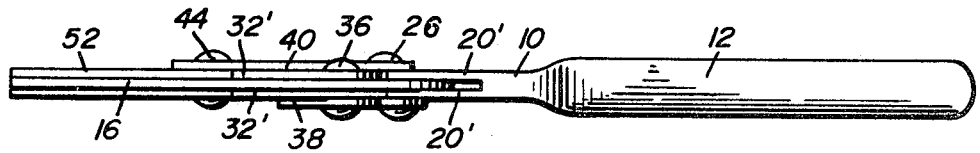
FIG. 2 is a top plan view of the assemblage illustrated in FIG. 1.

Referring now more specifically to the drawings the numeral 10 generally designates a first pair of shears constructed in accordance with the present invention and which includes a pair of handle levers 12 and 14 and a pair of pruning shear blades or jaws 16 and 18.

The lever 12 includes first and second bifurcated portions 20 and 22 including furcations 20' and 22', respectively, The jaw 16 includes a heel portion 24 which is pivotally secured between the furcations 20' by means of a pivot fastener 26 and a portion 28 of the lever 14 is pivotally secured between the furcations 22' by means of a pivot fastener 30.

The jaw 18 includes a heel portion 23 which is bifurcated and includes furcations 32' between which the portion 34 of the jaw 16 is pivotally secured by means of a pivot fastener 36 and a pair of arcuate connecting links 38 and 40 are connected between the jaw 18 and the lever 14. The first connecting link 38 is pivotally secured to the lever 14 by means of a pivot fastener 42 and to the portion 34 of the jaw 16 by means of the fastener 36. On the other hand, the second connecting link 40 is pivotally connected to the jaw 18 by means of a pivot fastener 44 and to the handle lever 14 by means of a pivot fastener 46.

The handle levers 12 and 14 include lugs 12' and 14', respectively, projecting toward each other over which the opposite ends of a compression spring 48 are telescoped whereby the free ends of the handle levers 12 and 14 are yieldingly urged apart. Also, it may be seen from FIG. 4 of the drawings that the blade portion or jaw 16 includes a sharpened straight edge 50 which coacts with a planar anvil surface 52 of an anvil 54 secured to the jaw 18 by means of fasteners 56 when the jaws 16 and 18 are closed.

As an alternate construction of the shears 10, the connecting link 40 may be somewhat elongated and attached to the handle lever 14 and the handle lever 12 by means of the fastener 30, in which instance the fastener 46 is not required.

Figure 4:
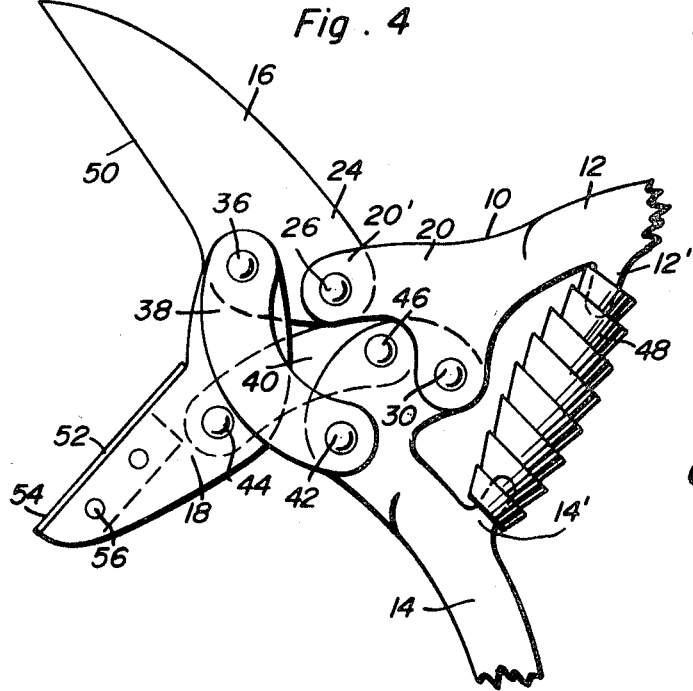
FIG. 4 is a fragmentary side elevational view of the shears illustrated in FIG. 1 but with the lever handles and blade portions thereof in their open positions.
Figure 3:
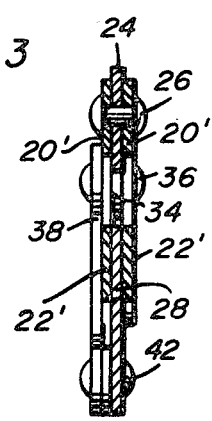
FIG. 3 is a fragmentary vertical sectional view taken substantially upon the plane indicated by the section line 3—3 of FIG. 1.

In operation, as the handle levers 12 and 14 of the shears 10 are moved from the full open position thereof illustrated in FIG. 4 of the drawings to the fully closed positions thereof illustrated in FIG. 1, the fastener 26 serves to pull rearward and upward on the heel portion 24 of the jaw 16 whereas the connecting link 38 tends to pull rearwardly and downwardly on the portion 34 of the jaw 16. Also, movement of the handle levers 12 and 14 to the closed positions causes the connecting link 40 to exert a forward force on the pivot fastener 44 and thus the cooperating edges of the jaws 16 and 18 are moved into juxtaposed relation such that illustrated in FIG. 1.

As the jaws 16 and 18 approach their fully closed positions, it will be noted that the pivot fastener 36 pivotally securing the jaws 16 and 18 together is disposed closely adjacent a plane containing the pivot axes of the pivot fasteners 42 and 46. Thus, the pivot fastener 42 is approaching an overcenter position and the pivot fastener 46 is directing a force on the pivot fastener 44 at substantially right angles to a plane containing the pivot axis defined by the pivot fasteners 36 and 42. In this manner, the mechanical advantage afforded by the shears 10 approaches its maximum as the jaws 16 and 18 are moved into juxtaposition.

Further, inasmuch as the jaws 16 and 18 are each supported at two pivot points, even when wear occurs at the cutting edges of the jaws 16 and 18, each jaw is capable of rocking slightly about a transverse axis so as to assure that the sharpened edge 50 will be disposed in planar relation with the anvil surface 52.

With attention now invited more specifically to FIGS. 5-8 of the drawings, there will be seen a second pair of shears 110 constructed in accordance with the present invention and which includes a pair of handle levers 112 and 114. The shears 110 also include a pair of blade portions or jaws 116 and 118 and the handle lever 112 includes a bifurcated portion 120 between whose furcations 120' and heel portion 124 of the jaw 116 is pivotally secured by means of the pivot fastener 126. In addition, one end of a connecting link 128 is pivotally supported between the furcations 120' by means of a pivot fastener 130.

The jaw 118 includes a bifurcated heel portion 132 between whose furcations 132' the portion 134 of the jaw 116 is pivotally secured by means of a pivot fastener 136. Also, the lever 114 includes a bifurcated portion 138 between whose furcations 138' the adjacent end of the connecting link 128 is pivotally secured by means of a pivot fastener 140.

The furcations 138' are interdigitated with the furcations 132' and pivotally secured to the jaw 118 by means of a pivot fastener 142. Also, one end of a second link 144 is also pivotally secured to the jaw 118 by means of the pivot fastener 142 and the other end of the second link 144 is pivotally secured to the handle lever 112 by means of a pivot fastener 148.

The lever handles 112 and 114 include lug portions 112' and 114' which project toward each other and over which the opposite ends of a compression spring 150 are disposed whereby the free ends of the lever handles 112 and 114 are urged apart. Also, the jaw 116 includes a straight sharpened edge 152 while the jaw 118 has an anvil 154 secured thereto in any convenient manner and including an anvil surface 156 with which the sharpened edge 152 cooperates when the jaws 116 and 118 are swung to their juxtaposed closed positions.

In operation, as the handle levers 112 and 114 are swung toward each other, the pivot fastener 126 exerts an upward and rearward pull on the heel portion 124 of the jaw 116 and the pivot fastener 142 exerts a forward and upward force on the jaw 118 whereby the jaws 116 and 118 are swung to the closed positions such as that illustrated in FIG. 5 of the drawings.

It will be noted that the fastener 136 is disposed closely adjacent the plane containing the pivot axes defined by the fasteners 130 and 148 when the jaws 116 and 118 are in their closed positions and it will further be noted that a line extending between the fasteners 142 and 148 is disposed at generally right angles to a line extending between the fasteners 136 and 140. Thus the mechanical leverage of the handle levers 112 and 114 acting upon the jaws 116 and 118 approaches its maximum as the jaws 116 and 118 are swung to their closed positions. Further, each of the jaws 116 and 118 is also supported at two pivot points whereby it will be assured that the sharpened edge 152 will be coplanar with the anvil surface 156 when the jaws 116 and 118 are closed.

Further, should greater leverage be desired, the shears 110 may be constructed with the fastener 130 and the upper end of the connecting lever 128 shifted further forward of a line connecting the fasteners 126 and 148, thus giving a greater lift on the front end of the handle 112 from the handle 114 and aiding the breakdown on the rear end of the upper handle 112. In this respect, when the free ends of the handles 112 and 114 are urged together, pressure from the fastener 140 is directed upwardly on the link 128 and thus the fastener 130 tending to rotate the handle 112 in a clockwise direction and thus increasing the downward pull of the fastener 126 on the heel portion 124. This in turn enables the fastener 148 to exert a forward thrust on the lever 144 and thus a forward and upward thrust on the fastener 142 and lower jaw 118.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A pair of shears including a pair of elongated jaws including base and tip ends and pivotally connected for relative swinging about a first axis stationarily positioned relative to both jaws, said jaws including coacting opposing jaw edges for cutting objects therebetween as the jaws are swung toward closed positions, lever means including a pair of levers connected together at a first set of corresponding ends thereof for relative swinging, one of said levers also being pivotally connected to one of said jaws, and elongated link means pivotally connected to the other jaw and the lever means pivotally connected to the other jaw and the lever means for relative swinging of said jaws in response to relative swinging of said levers, said link means including a first link connected between said one jaw and said other lever and a second link connected between said other jaw and said other lever.

2. The combination of claim 1 wherein the axes of relative oscillation of said levers and the axes of oscillation of said first and second links relative to said other lever pass through the apices of a triangle disposed normal to said axes.

3. The combination of claim 1 wherein said axis of relative oscillation of said jaws is disposed closely adjacent a line joining the axes of oscillation of said links relative to said other lever when said jaws are in their closed positions.

4. The combination of claim 1 wherein the base end of said other jaw is bifurcated, a portion of said one jaw intermediate the opposite ends thereof being pivotally secured between the furcations of said base end of said other jaw.

5. The combination of claim 4 wherein said one lever is pivotally connected to the base end of said one jaw.

6. The combination of claim 1 including spring means operatively connected between said levers at points spaced intermediate their opposite ends urging the other set of corresponding ends of said levers away from each other.

7. A pair of shears having first and second upper and lower jaws each including front and rear ends, a pair of first and second upper and lower elongated levers having front and rear ends, the front end of said first lever being pivotally secured to the rear end of said first jaw for relative oscillation about a first transverse axis, said jaws including coacting opposing jaw edges for cutting objects therebetween as the jaws are swung toward closed positions, the rear end of said second jaw being pivotally secured to the rear end portion of said first jaw for relative oscillation about a second transverse axis forward and below said first axis, the front end of said second lever being pivotally secured to the front end portion of said first lever for oscillation about a third transverse axis spaced below said first and second axes and rearward of said second axis, a first horizontal link pivotally secured at its rear end to the forward end portion of said second lever for oscillation about a fourth transverse axis spaced forward and below said third axis and at its forward end to the rear end portion of said second jaw for oscillation about a fifth transverse axis spaced forward and below said second axis and a second upstanding link pivotally secured at its lower end to the forward end portion of said second lever for oscillation about a sixth transverse axis spaced below said fourth axis and at its upper end to the rear end portion of said first jaw about said second axis.

* * * * *